United States Patent [19]

Narayan et al.

[11] 4,382,125
[45] May 3, 1983

[54] ISOCYANURATE-MODIFIED POLYMETHYLENE POLYPHENYLENE POLYISOCYANATE COMPOSITIONS

[75] Inventors: Thirumurti Narayan, Grosse Ile; Peter T. Kan, Plymouth; John T. Patton, Jr., Wyandotte, all of Mich.

[73] Assignee: BASF Wyandotte Corporation, Wyandotte, Mich.

[21] Appl. No.: 325,684

[22] Filed: Nov. 30, 1981

[51] Int. Cl.³ ............................................. C08G 18/14
[52] U.S. Cl. .................... 521/160; 521/161; 521/902; 528/53; 528/67; 528/73; 544/180; 544/193
[58] Field of Search ............. 521/160, 161, 902; 528/53, 67, 73; 544/180, 193

[56] References Cited

U.S. PATENT DOCUMENTS

| | | | |
|---|---|---|---|
| 3,645,979 | 2/1972 | Liebsch et al. | 521/161 |
| 3,652,424 | 3/1972 | Jackson et al. | 528/45 |
| 3,723,363 | 3/1973 | Shaw | 521/159 |
| 3,996,223 | 12/1976 | Gupta et al. | 521/159 |

*Primary Examiner*—Maurice J. Welsh
*Attorney, Agent, or Firm*—Norbert M. Lisicki

[57] ABSTRACT

A stable isocyanurate-modified polyisocyanate prepared by trimerizing an organic polyisocyanate mixture of 45 to 70 percent by weight of diphenylmethane diisocyanate having an isomer mixture of 40 to 100 weight percent, 4,4'-, 0 to 50 weight percent 2,4-, and 0 to 10 weight percent 2,2'-diphenylmethane diisocyanate and from 30 to 55 percent by weight polymethylene polyphenylene polyisocyanate with an isocyanurate content of 20 to 33 percent by weight. Polyurethane isocyanurate foams prepared from the reaction of these isocyanates with active hydrogen compounds selected from the group consisting of diethylene glycol and ethylene oxide adducts of trimethylolpropane, trimethylolethane, and glycerine exhibit good K-factors, low friability and low smoke density.

2 Claims, No Drawings

ISOCYANURATE-MODIFIED POLYMETHYLENE POLYPHENYLENE POLYISOCYANATE COMPOSITIONS

BACKGROUND OF THE INVENTION

1. Field of the Invention

The present invention relates to isocyanurate-modified polymethylene polyphenylene polyisocyanate compositions and to foams prepared from said polyisocyanate compositions. More particularly, the invention relates to polyisocyanate compositions containing from 15 to 50 weight percent isocyanurate content and to polyurethane isocyanurate foams prepared by reacting these compositions with oxyethylated polyols.

2. Description of the Prior Art

The prior art generally teaches the preparation of isocyanurate-modified isocyanate products, employing a variety of catalysts. U.S. Pat. No. 3,996,223 teaches a process for the preparation of polyurethane quasi-prepolymers containing isocyanurate structures by polymerization in the presence of catalytic quantites of a mixture of Mannich bases and carbamic acid esters prepared from isocyanates and alcohols containing secondary alcohol groups. U.S. Pat. No. 3,645,979 teaches the polymerization of an aromatic polyisocyanate and an aliphatic polyisocyanate in the presence of an organic phosphine catalyst. U.S. Pat. No. 3,652,424 teaches a process for the preparation of polyisocyanate compositions containing 5 to 19 percent by weight of toluene diisocyanate trimer by employing as trimerization catalysts substituted guanidines and isobiguanidines.

U.S. Pat. No. 3,723,363 teaches the preparation of polyurethane products by reacting a trimerized crude polyisocyanate having a functionality of at least 1.5 and preferably at least 3 with an isocyanurate content of 2 to 12 percent with various polyols. It further teaches that the preferred polyols are obtained by oxypropylating polyhydroxy compounds such as sucrose, sorbitol, glycerine, trimethylolpropane, 1,2,6-hexanetriol, pentaerythritol or mixtures thereof.

DESCRIPTION OF THE PREFERRED EMBODIMENTS

A stable isocyanurate-modified polyisocyanate composition is prepared by partially trimerizing, in the presence of an effective amount of a trimerization catalyst, an organic polyisocyanate mixture of 45 to 70 percent by weight of diphenylmethane diisocyanate having an isomer mixture of 40 to 100 weight percent 4,4'-, 0 to 50 weight percent 2,4-, and 0 to 10 weight percent 2,2'-diphenylmethane diisocyanate and from 30 to 55 percent by weight polymethylene polyphenylene polyisocyanate to the extent that the conversion to isocyanurate based on the NCO content is from about 20 to 33 percent by weight and the Brookfield viscosity in centipoises at 25° C. is from about 1000 to 100,000. After deactivating the trimerization catalyst, the isocyanurate-modified polyisocyanate employing a 100 to 500 index may be used to prepare polyurethane isocyanurate foams which exhibit excellent compression strength, friability and K-factors with substantially improved NBS smoke density values to fulfill the increasing requirements of the urethane industry.

The polyurethane isocyanurate foam may be prepared by reacting an isocyanurate modified polyisocyanate containing a mixture of 45 to 70 percent by weight diphenylmethane diisocyanate, an organic polyisocyanate mixture of 45 to 70 percent by weight of diphenylmethane diisocyanate having an isomer mixture of 40 to 100 weight percent 4,4', 0 to 50 weight percent 2,4, and 0 to 10 weight percent 2,2' diphenylmethane diisocyanate and from 30 to 55 percent by weight polymethylene polyphenylene polyisocyanate, to the extent that the conversion to isocyanurate based on the NCO content is from about 20 to 33 percent by weight and a Brookfield viscosity from 1000 to 100,000 centipoises at 25° C., with an active hydrogen compound in the presence of blowing agents, surfactants and optionally crosslinking agents.

The active hydrogen compounds are preferably selected from the group consisting of diethylene glycol and ethylene oxide adducts of trimethylolpropane, trimethylolethane, and glycerine having equivalent weights of 53 to about 500. However, the ethylene oxide adducts of pentaerythritol, sorbitol, sucrose, butanediol, α-methylglucoside and similar active hydrogen compounds are useful in this invention. Also contemplated for use are esters of ethylene glycol and phthalic, terephthalic and isophthalic acids. In a similar manner the esters of ethylene glycol and acids such as succinic, glutaric and adipic may be employed.

That portion of the polyisocyanate which is trimerized is characterized by the presence of the isocyanurate radical in its structure and in its simplest form may be represented by the formula

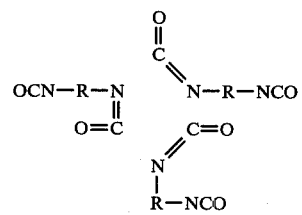

wherein R is $$R = -O-CH_2-O-NCO$$

$$CH_2 N-O-NCO$$

and x=0 to 5.

The products of this invention, however, are complex mixtures in which trimerized and untrimerized molecules are present, and thereby we do not wish to be bound by the structures exemplified above.

The isocyanurate-modified polyisocyanate compositions of the instant invention may be prepared by employing well-known compounds as trimerization catalysts. Examples of these catalysts are (a) organic strong bases, (b) tertiary amine co-catalyst combinations, (c) Friedel Craft catalysts, (d) basic salts of carboxylic acids, (e) alkali metal oxides, alkali metal alcoholates, alkali metal phenolates, alkali metal hydroxides and alkali metal carbonates, (f) onium compounds from nitrogen, phosphorus, arsenic, antimony, sulfur and selenium, and (g) monosubstituted monocarbamic esters. These include 1,3,5-tris(N,N-dialkylaminoalkykl)-s-hexahydrotriazines; the alkylene oxide and water or carboxylic acid adducts of 1,3,5-tris(N,N-dialkylaminoalkyl)-s-hexahydrotriazines; 2,4,6-tris(dimethylaminomethyl)phenol; ortho, para- or a mixture of o- and p-dimethylaminomethyl phenol and triethylenediamine or the alkylene oxide and water carboxylic acid adducts thereof, metal carboxylates such as lead octanoate, sodium and potassium salts of hydroxamic acid, and organic boron-containing compounds. Monofunctional alkanols containing from 1 to 24 carbon atoms, epoxides containing 2 to 18 carbon atoms and alkyl carbonates may be used in conjunction with tertiary amine to accelerate the rate of the polymerization reaction. The concentration of trimerization catalysts that may be employed in the present invention is from 0.001 part to 20 parts of catalyst per 100 parts of organic polyisocyanate. The temperature ranges which may be employed for the trimerization reaction may range from 25° C. to 230° C., preferably from 25° C. to 120° C.

The trimerization catalysts may be deactivated employing an acid or an acid chloride. The acids such as hydrochloric acid, sulfuric acid, acetic acid, oxalic acid, phosphonic acid, methanesulfonic acid, trifluoromethanesulfonic acid, benzene-, toluene- or xylenesulfonic acids, acid chlorides such as acetyl or benzoyl chloride, and sulfonyl chlorides such as benzene, toluene or xylene sulfonyl chloride may be employed. Another series of deactivators which are alkylating agents such as dimethyl sulfate, o, or p-alkyl toluenesulfonates, and methyl chloride may also be employed.

In accordance with the present invention, rigid foams may be prepared by catalytic reaction of the modified organic polyisocyanates with polyols in the presence of blowing agents, surfactants and other additives which may be deemed necessary. Non-cellular products may also be prepared in the absence of blowing agents.

Typical polyols which may be employed in the preparation of the foams of the instant invention include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric sulfur-containing esters, polyacetals, aliphatic polyols or diols, ammonia, and amines including aromatic, aliphatic and heterocyclic amines as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used. Generally, the equivalent weight of the polyols will vary from 100 to 10,000, preferably from 1,000 to 3,000.

Any suitable hydroxy-terminated polyester may be used such as are obtained, for example, from the reaction of polycarboxylic acids and polyhydric alcohols. Any suitable polycarboxylic acid may be used such as oxalic acid, malonic acid, succinic acid, glutaric acid, adipic acid, pimelic acid, suberic acid, azelic acid, sebacic acid, brassylic acid, thapsic acid, maleic acid, fumaric acid, glutaconic acid, α-hydromuconic acid, β-butyl-a-ethyl-glutaric acid, α β-diethylsuccinic acid, isophthalic acid, terephthalic acid, hemimellitic acid, and 1,4-cyclohexanedicarboxylic acid. Any suitable polyhydric alcohol may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

Any suitable polyoxyalkylene polyether polyol may be used such as the polymerization product of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, ethylene glycols, poly-1,2-oxybutylene and polyoxyethylene glycols, poly-1,4-tetramethylene and polyoxyethylene glycols, and copolymer glycols prepared from blends as well as sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-bis(4-hydroxyphenyl)-propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acid set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2- propanedithiol, 1,2-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and diaminotoluene; aliphatic amines such as methylamine, triisopropanolamine, ethylenediamine, 1,3-diaminopropane, 1,3-diaminobutane, and 1,4-diaminobutane.

Polyurethane foams may also be prepared by reacting organic polyisocyanates with a graft polymer polyol in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane products are disclosed in U.S. Pat. No. Re. 24,514 together with suitable machinery to be used in conjunction therewith. For the preparation of microcellular foams, blowing agents are generally not necessary. If desired for more expanded foams, they may be employed. When water is used, corresponding quantities of excess isocyanate to react with the water and produce carbon dioxide are necessary.

It is possible to proceed with the preparation of the polyurethane products by a prepolymer technique wherein an excess of the modified organic polyisocyanate is reacted in a first step with a polyol to prepare a prepolymer having free isocyanate groups which is then reacted in a second step with a polyol or an amine and a blowing agent such as water or a fluorocarbon to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol, and primary and secondary diamines which react more readily with the polyisocyanates than does water. These include phenylenediamine, ethylenediamine, diethylenetriamine, N-(2-hydroxypropyl)-ethylenediamine, N,N'-di(2-hydroxypropyl)ethylenediamine, piperazine, and 2-methylpiperazine.

Any suitable catalyst for the polyurethane formation may be used including tertiary amines such as, for example, triethylenediamine, N-methylmorpholine, N-ethylmorpholine, diethylaminoethanol, N-laurylmorpholine, 1-methyl-4(dimethylaminoethyl)piperazine, 3-methoxy-N,N'-dimethylpropylamine, N,N,N'-trimethylisopropylpropylenediamine, N,N,N',N'-tetraethylpropylenediamine, dimethylbenzylamine, and the like. Other suitable catalysts are, for example, tin compounds such as stannous chloride, tin salts of carboxylic acids, such as dibutyltin di-2-ethyl hexanoate and stannous octoate, as well as other organo metallic compounds such as are disclosed in U.S. Pat. No. 2,846,408.

If desired, a surface-active agent may be employed. Numerous surface-active agents have been found satisfactory. Nonionic surface-active agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkylsulfonic esters, and alkylarylsulfonic acids.

In the following examples, all parts are by weight unless otherwise designated and the following abbreviations are employed.

Polyol A is an ethylene oxide adduct of trimethylolpropane with a hydroxyl number of 561.

Polyol B is an ethylene oxide adduct of trimethylolpropane with a hydroxyl number of 230.

Polyol C is a propylene oxide adduct of trimethylolpropane with a hydroxyl number of 398.

Polyisocyanate A is a polymethylene polyphenylene polyisocyanate having an average functionality of 2.7 and an NCO content by weight of 31.5 percent.

Polyisocyanate B is a polymethylene polyphenylene polyisocyanate having an average functionality of 3.0 and an NCO content by weight of 29.8 percent.

Polyisocyanate C is an isocyanurate-modified polyisocyanate A with an NCO content of 27.5 weight percent.

Catalyst A is a mixture of one gram of potassium 2-ethylhexanoate and one gram of DMP-30 dissolved in eight grams of polyethylene glycol, m.w. 200.

Catalyst B is a mixture of one gram of furfuryl alcohol, six grams of TDH and 0.2 grams of dibutyltin diacetate.

FREON 11A—Trichloromonofluoromethane sold by duPont.

DC 193—Silicone surfactant sold by Dow Corning Corporation.

TDH—1,3,5 tris (N,N-Dimethylaminopropyl)-s hexahydro-5-triazine.

DMP 30—2,4,6-tris (Dimethylaminomethyl)phenol.

EXAMPLES 1-6

These examples illustrate the preparation of the polyisocyanates in accordance with the present invention.

Into a separate reaction vessel equipped with an inlet for nitrogen gas, stirrer, and thermometer, the indicated quantities of polyisocyanate and catalyst were added. The reaction proceeded at the reaction temperatures and times as noted below. After the desired decrease in isocyanate was reached, an amount of benzoyl chloride equivalent to one half of the catalyst was added to deactivate the catalyst. The results are shown in Table I below. The initial NCO content was 31.5 percent. The percent conversion is based on the final NCO content.

TABLE I

| Example | Polyisocyanate A gms | TDH gms | Reaction Temp., °C./Time, Hour | NCO, % | NCO % After 6 Months | Percent Conversion | Viscosity cps/25° C. |
| --- | --- | --- | --- | --- | --- | --- | --- |
| 1 | 1000 | 1.0 | 30/2 | 27.2 | 27.6 | 24.8 | 13,200 |
| 2 | 1000 | 1.0 | 60/1.25 | 26.3 | 26.4 | 32.3 | 55,600 |
| 3 | 3000 | 3.0 | 40/0.75 | 27.4 | 27.3 | 26.0 | 5,650 |
| 4 | 3000 | 2.5 | 33/1 | 27.8 | 27.9 | 22.9 | 3,150 |
| 5 | 3000 | 2.5 | 34/1.5 | 28.2 | 28.4 | 19.7 | 2,500 |
| 6 | 3000 | 2.5 | 34/12.5 | 28.5 | 28.4 | 19.7 | 1,930 |

As shown, the modified polyisocyanates of the invention did not exhibit any loss of isocyanate content after storage of six months at ambient conditions, indicating excellent storage stability.

EXAMPLES 7–10

The foams of examples 7–10 were prepared by mixing a blend of the designated polyisocyanate with a blend of the polyol and pouring the resulting mixture into a mold. The foam was allowed to rise and the resulting physical properties (Table II) were determined on the finished foam. The formulation employed was:

| Isocyanate Blend, pbw | Polyol Blend, pbw |
| --- | --- |
| Designated Isocyanate, 200 | Polyol A, 40 |
| FREON F-11A, 50 | DC-193, 2 |
| | Catalyst A, 10 |

The following polyisocyanates were employed:

| Example | Polyisocyanate |
| --- | --- |
| 7 | A |
| 8 | B |
| 9 | Example 6 |
| 10 | Example 5 |

TABLE II

| Physical Properties | Example 7 | 8 | 9 | 10 |
| --- | --- | --- | --- | --- |
| Density, pcf | 1.7 | 1.7 | 1.8 | 1.8 |
| K-Factor, Initial | 0.111 | 0.109 | 0.106 | 0.108 |
| Aged, 10 days 140° F. | 0.141 | 0.134 | 0.132 | 0.134 |
| Compr. Str., psi, 10% defl. | 27 | 33 | 33 | 32 |
| Friab., wt. loss. % | 18 | 10 | 8 | 11 |
| Butler Test wt. retained % | 87 | 74 | 77 | 80 |
| Flame Height, inches | 8.5 | 9.8 | 7.5 | 8.3 |
| NBS Smoke Density, Dm. | 70 | 102 | 45 | 39 |

EXAMPLES 11–16

Foams were prepared employing the polyisocyanates of the various examples as listed in the formulations in Table III. The physical properties indicate good K-factors, low friability, and low smoke density.

TABLE III

| | Examples 11 | 12 | 13 | 14 | 15 | 16 |
| --- | --- | --- | --- | --- | --- | --- |
| Formulation, pbw | | | | | | |
| Polyisocyanate | Ex 4/200 | Ex 3/200 | Ex 6/200 | Ex 5/200 | Ex 6/200 | Ex 5/200 |
| Freon 11A | 50 | 50 | 50 | 50 | 44.4 | 44.4 |
| DC 193 | 2.0 | 2.0 | 2.0 | 2.0 | 4.8 | 4.8 |
| Polyol A | 40 | 40 | — | — | — | — |
| Polyol B | — | — | 40 | 40 | — | — |
| Diethylene Glycol | — | — | — | — | 18.5 | 18.5 |
| Catalyst Type/pbw | A/10 | A/10 | B/7.2 | B/7.2 | A/12 | A/12 |
| Physical Properties | | | | | | |
| Density, pcf | 1.8 | 1.8 | 1.6 | 1.7 | 1.9 | 1.8 |
| Compression Strength 10% Defl. psi | 32 | 33 | 14[b] | 14[b] | 36 | 40 |
| Closed Cells, % | 93 | 93 | 90 | 90 | 93 | 95 |
| K-Factor, initial | 0.108[b] | 0.108[b] | 0.135[c] | 0.135[c] | 0.105 | 0.103 |
| Aged, 10 days 140° F. | 0.132 | 0.130 | 0.180 | 0.176 | 0.130 | 0.130 |
| Friability, % wt. loss | 10 | 7 | 15 | 18 | 11 | 9 |
| Butler Chimney Test wt. retained, % | 81 | 75 | 81 | 80 | 92 | 89 |
| Flame Height, Index | 8.7 | 7.9 | 8.3 | 8.7 | 7.1 | 7.5 |
| NBS Smoke Density, DM | 63 | 55 | 40 | 45 | 62 | 69 |

[b]Perpendicular to rise
[c]Parallel to rise

EXAMPLES 17–20

The foams of Examples 17–20 were prepared in a manner similar to that employed in Examples 7–10. The formulations employed and the resulting physical properties obtained are listed in Table IV below. The NCO content of the polyisocyanate was 25.5 weight percent. The polyol employed was Polyol C. In these comparative examples, foams were prepared using polyoxypropylene polyether polyols.

The physical properties of these foams compare poorly with the physical properties of the foams of this invention as exemplified in Examples 9 through 16.

TABLE IV

| | Examples 17 | 18 | 19 | 20 |
| --- | --- | --- | --- | --- |
| Formulation, pbw | | | | |

TABLE IV-continued

| | Examples | | | |
|---|---|---|---|---|
| | 17 | 18 | 19 | 20 |
| Polyisocyanate, C | 200 | 200 | 200 | 200 |
| Freon 11A | 50 | 50 | 50 | 50 |
| DC 193 | 2 | 2 | 2 | 2 |
| Catalyst A | 10 | 10 | 10 | 10 |
| Physical Properties | | | | |
| Density, pcf | 1.8 | 1.8 | 1.8 | 1.8 |
| Closed Cells, % | 88 | 88 | 89 | 88 |
| K-Factor, initial | 0.123 | 0.125 | 0.124 | 0.125 |
| Aged, 10 days 140° F. | 0.154 | 0.154 | 0.154 | 0.153 |
| Friability wt. loss, % | 18 | 16 | 20 | 22 |
| Butler Chimney Test | | | | |
| wt. retained, % | 55 | 39 | 39 | 41 |
| Flame Height, inches | 10 | 10 | 10 | 10 |
| NBS Smoke Denisty, DM | 70 | 77 | 70 | 60 |

The embodiments of the invention in which an exclusive privilege or property is claimed are defined as follows:

1. A polyurethane isocyanurate foam prepared by reacting: (a) an isocyanurate-modified polyisocyanate containing a mixture of 45 to 70 percent by weight diphenylmethane diisocyanate, an organic polyisocyanate mixture of 45 to 70 percent by weight of diphenylmethane diisocyanate having an isomer mixture of 40 to 100 weight percent 4,4'-, 0 to 50 weight percent 2,4-, and 0 to 10 weight percent 2,2'- diphenylmethane diisocyanate and from 30 to 55 percent by weight polymethylene polyphenylene polyisocyanate, to the extent that the conversion to isocyanurate based on the NCO content is from about 20 to 33 percent by weight and a Brookfield viscosity from 1,000 to 100,000 centipoises at 25° C., and (b) an active hydrogen compound selected from the group consisting of diethylene glycol and ethylene oxide adducts of trimethylolpropane, trimethylolethane and glycerine, in the presence of blowing agents, surfactants and optionally crosslinking agents.

2. The polyurethane isocyanurate foam of claim 1 wherein said active hydrogen compounds have an equivalent weight of 53 to about 500.

* * * * *